(12) United States Patent
Wang et al.

(10) Patent No.: US 10,226,841 B2
(45) Date of Patent: Mar. 12, 2019

(54) APERTURE PLATE FOR OVERHEATING PREVENTION AND WIRE NOZZLE PROTECTION

(71) Applicant: GM GLOBAL TECHNOLOGY OPERATIONS LLC, Detroit, MI (US)

(72) Inventors: Hui-ping Wang, Troy, MI (US); Michael G. Poss, Warren, MI (US); Aaron D. Cox, Harrison Township, MI (US); Blair E. Carlson, Ann Arbor, MI (US); Thomas A. Perry, Bruce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 451 days.

(21) Appl. No.: 15/200,452

(22) Filed: Jul. 1, 2016

(65) Prior Publication Data
US 2017/0036305 A1    Feb. 9, 2017

Related U.S. Application Data

(60) Provisional application No. 62/201,003, filed on Aug. 4, 2015.

(51) Int. Cl.
*B23K 26/70*    (2014.01)
*B23K 26/064*   (2014.01)
*B23K 26/21*    (2014.01)
*B23K 37/00*    (2006.01)

(52) U.S. Cl.
CPC .......... *B23K 26/706* (2015.10); *B23K 37/006* (2013.01)

(58) Field of Classification Search
CPC ......... B23K 26/70; B23K 26/06; B23K 26/21
USPC ............... 219/121.13, 121.2, 121.63–121.72
See application file for complete search history.

(56) References Cited

U.S. PATENT DOCUMENTS

| 6,600,856 B1* | 7/2003 | Lewis ................. B82Y 20/00 219/121.66 |
| 9,662,173 B1* | 5/2017 | Griffin ................. A61B 18/24 |
| 2002/0045811 A1* | 4/2002 | Kittrell ............. A61B 1/00096 600/407 |

FOREIGN PATENT DOCUMENTS

| CN | 1255411 A | 6/2000 |
| CN | 102256738 A | 11/2011 |
| CN | 202070857 U | 12/2011 |
| CN | 102357734 A | 2/2012 |
| CN | 103855042 A | 6/2014 |
| CN | 104289818 A | 1/2015 |
| JP | H08111551 A | 4/1996 |

* cited by examiner

*Primary Examiner* — Samuel M Heinrich
(74) *Attorney, Agent, or Firm* — Quinn IP Law

(57) ABSTRACT

An aperture plate for a welding apparatus includes a body defining an aperture. The body of the aperture plate includes a first end and a second end that is opposite the first end. In addition, the body includes a first surface intersecting the first and second ends. Moreover, the body includes a second surface formed opposite the first surface. The second surface is nonparallel to the first surface.

20 Claims, 5 Drawing Sheets

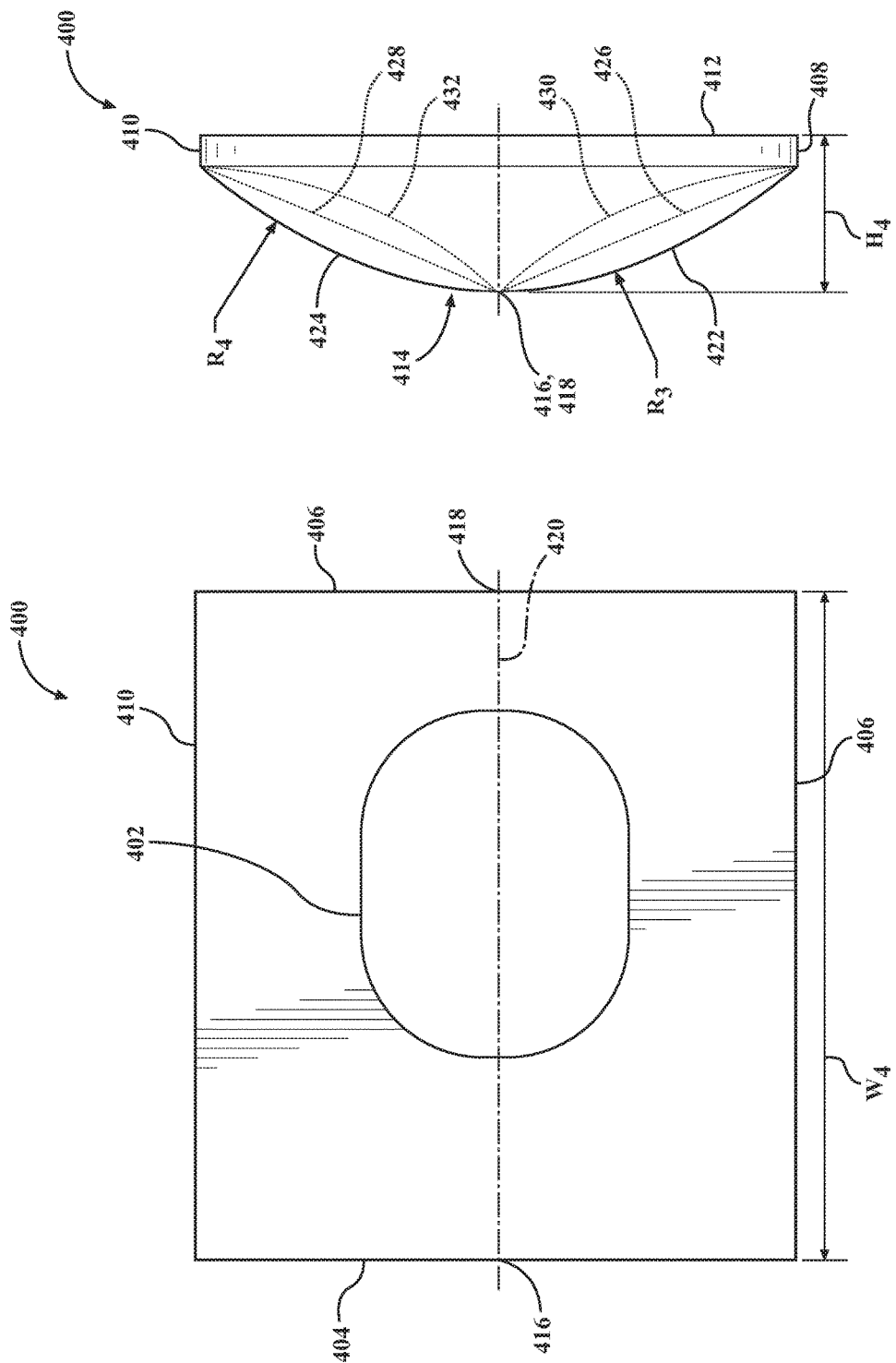

APERTURE PLATE FOR OVERHEATING PREVENTION AND WIRE NOZZLE PROTECTION

CROSS-REFERENCE TO RELATED APPLICATIONS

This application claims the benefit of U.S. Provisional Patent Application Ser. No. 62/201,003, filed on Aug. 4, 2015, the disclosure of which is hereby incorporated by reference.

TECHNICAL FIELD

The present disclosure relates to a method and apparatus for welding.

BACKGROUND

Welding is a manufacturing process for joining materials to form a bond. In general, welding includes the fusion of the materials together, i.e., melting the base materials to join them together as a single component. Melting the base materials generates a pool of molten material (a melt pool) where the bond is formed. A filler material is often added to the melt pool to facilitate improving the properties of the bond and to fill gaps where acceptable joint fit-up cannot be achieved.

Beam welding is one process for joining materials. Examples of beam welding include laser beam welding and electron beam welding. Laser beam welding is a fusion welding process where a concentrated beam of light is directed and focused by an optical system to a concentrated spot on the materials being joined. Some laser welding systems include an aperture plate, or aperture shield, located between the workpiece and the welding head to facilitate protecting the welding head and the optical system from beam reflections and spatter from the welding process.

SUMMARY

In one aspect, an aperture plate for a welding apparatus is provided. The aperture plate includes a body defining an aperture. The body of the aperture plate includes a first end and a second end that is opposite the first end. In addition, the body includes a first surface intersecting the first and second ends. Moreover, the body includes a second surface formed opposite the first surface. The second surface is nonparallel to the first surface.

In another aspect, a welding apparatus for welding a workpiece is provided. The welding apparatus includes an energy source configured to generate a melt pool in a zone of the workpiece. In addition, the welding apparatus includes an aperture plate releasably coupled to the welding apparatus. The aperture plate includes at least one fluid routing channel defined within the aperture plate, such that convective heat transfer away from the aperture plate occurs via a fluid source coupled in flow communication with the fluid routing channel In yet another aspect, a method of fabricating an aperture plate for a welding apparatus is provided. The method includes providing a body defining an aperture. The body includes a first end and a second end opposite the first end. The method also includes forming a first surface that extends between the first and second ends. In addition, the method includes forming a second surface opposite the first surface. The second surface is formed nonparallel to the first surface, such that electromagnetic radiation is reflected away from components of the welding apparatus.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

FIG. 4 is an illustrative bottom view of an aperture plate for use with a welding apparatus;

FIG. 5 is an illustrative end view of the aperture plate of FIG. 4;

DETAILED DESCRIPTION

Referring to the figures, examples of the disclosure provide an aperture plate configured to deflect or scatter energy reflected off a workpiece from an energy source. As described herein, various surface configurations are implemented in the aperture plate to disperse the reflected energy and reduce the concentration of reflected energy toward other adjacent components.

Aspects of the disclosure further provide aperture plate configurations that reduce energy and thermal absorption by the aperture plate. In these examples, elements of the aperture plate may be configured to transfer heat away from the aperture plate or reflect energy away from the aperture plate, or both.

Aperture plates may be used in various implementations, including welding processes. Welding systems may utilize aperture plates to shield other system components, such as an optical system for example, from reflected energy. In laser beam welding, for example, the beam and/or weld spatter may be reflected from the material surface and/or the weld zone back to the laser welding system, e.g., the welding head or the optical system.

Figure 1:
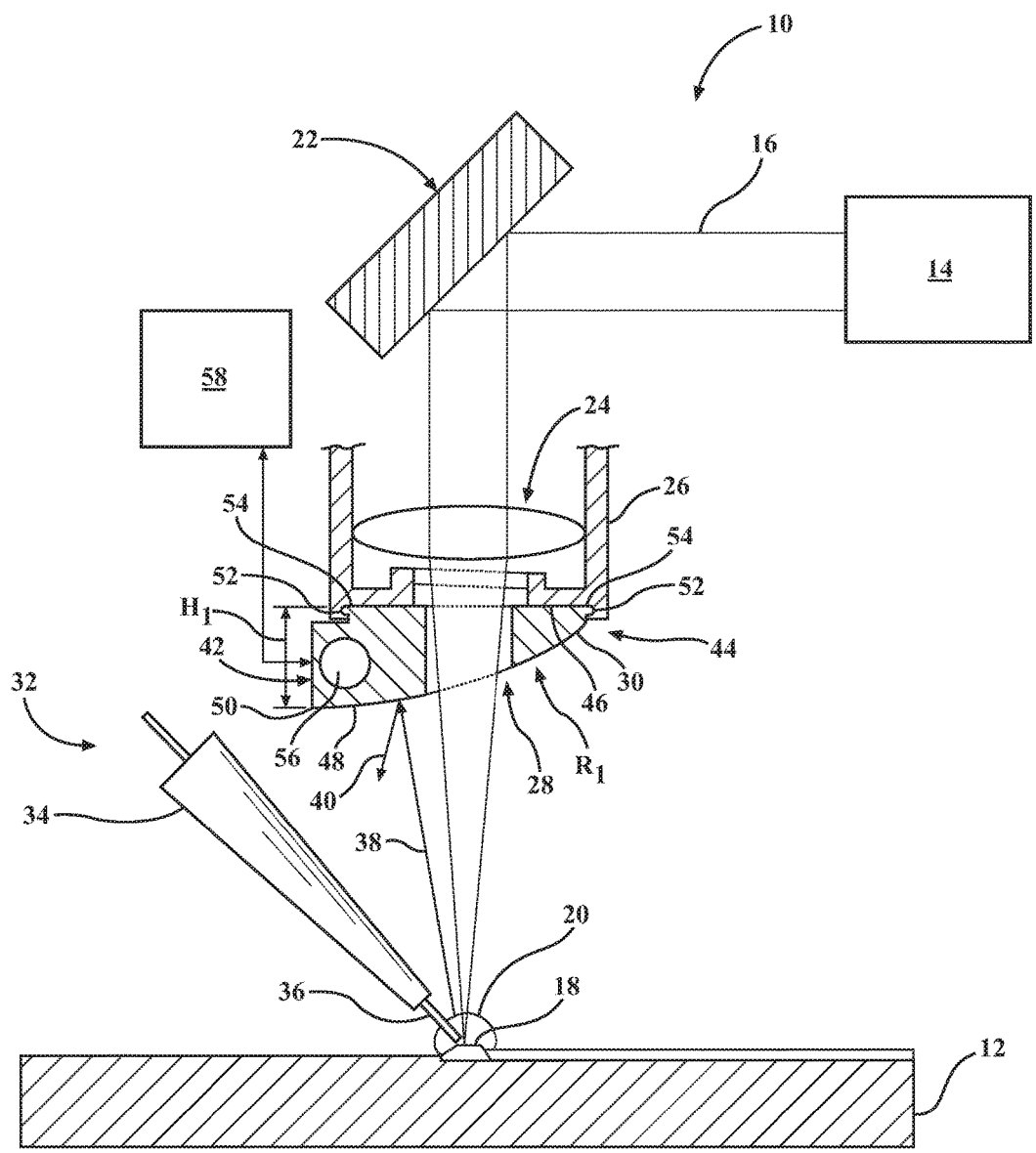
FIG. 1 is an illustrative schematic side view of a welding apparatus for welding a workpiece.

Referring now to FIG. 1 an illustrative schematic side view of a welding apparatus is shown. Welding apparatus 10 may be used for welding a workpiece 12. The workpiece 12 may be formed from either a ferrous or a non-ferrous material suitable for being welded, for example, without limitation, steel, magnesium, aluminum, and alloys thereof. In this example, the workpiece 12 may be a material with high specular reflectivity, such as aluminum or an aluminum alloy.

The welding apparatus 10 includes an energy source 14 that emits electromagnetic radiation in the form of a beam 16 for generating a melt pool 18 in the workpiece 12. In some examples, the welding apparatus 10 includes more than one energy source 14. For example, without limitation, an alternative welding apparatus may include a first energy source having a first power and a second energy source having a second power that may be different from the first power, or an alternative welding apparatus may include at least two energy sources having substantially the same power output. However, welding apparatus 10 may include any number and combination of energy sources that enable welding apparatus 10 to operate as described herein. Furthermore, the energy source 14 may be any energy source suitable for generating the melt pool 18 in the workpiece 12, for example, without limitation, an energy source for generating a laser beam, an electron beam, a plasma beam, a welding arc, or a hybrid energy source such as a laser/arc. In one example, the energy source 14 is a laser device that generates a concentrated beam of coherent, monochromatic light for laser beam welding, for example.

Laser beam welding of aluminum based materials, or materials with high specular reflectivity, is challenging due to the poor coupling of the laser energy with the highly-reflective material. For example, during laser beam welding of aluminum there is often reflection of the beam 16 from the workpiece 12 back to the welding apparatus 10. Furthermore, some aluminum alloys contain magnesium or zinc, which are materials that are easily vaporized. The vaporized material forms a vapor cloud 20 around the melt pool 18, which facilitates reducing an amount of the beam 16 that reaches the workpiece 12. During the laser beam welding process, the interaction between the beam 16 and the workpiece 12 emit energy in the form of electromagnetic radiation, or optical emissions. The vapor cloud 20, the melt pool 18, and the beam 16 reflection are sources of such optical emissions. These optical emissions may damage the welding apparatus 10, including an aperture shield or aperture plate 30, by causing an excessive thermal load, thereby causing overheating.

While the emissions are described as including optical emissions, it should be noted that use of the term "optical" is not to be equated with the term "visible." The optical emissions as described herein include a wide spectral range. The optical emissions include light (i.e., electromagnetic radiation) with wavelengths in the ultraviolet (about 200-400 nanometers (nm)), visible (about 400-700 nm), near-infrared (about 700-1200 nm), and infrared ranges (about 1200-10000 nm) of the electromagnetic spectrum.

In this example, the energy source, or laser device, 14 is optically coupled to a mirror 22 and optics 24 for directing and focusing the beam 16 to a concentrated spot on the workpiece 12 for increase power density. In some examples, the mirror 22 may be a galvanometer configured to control scanning of the beam 16 across the workpiece 12. In such examples, the galvanometers may include two-dimension (2D) scan galvanometers, three-dimension (3D) scan galvanometers, dynamic focusing galvanometers, and/or any other galvanometer system that may be used to deflect the beam 16 of the energy source 14.

As shown in FIG. 1, the optics 24 are coupled within a welding head 26, which may be typically coupled to a laser delivery robotic arm (not shown). The optics 24 are configured to focus the beam 16 to a concentrated spot on the workpiece 12 through an aperture 28 defined by the aperture plate 30. Coupled to the welding apparatus 10 is a filler material apparatus 32, in this illustrative example. The filler material apparatus 32 includes a nozzle 34 having a hollow bore (not shown) defined therethrough. The filler material apparatus 32 may also include a filler material 36 that is delivered through the hollow bore of the nozzle 34 proximate to the melt pool 18 generated by the beam 16 in the workpiece 12, in examples where filler material may be used. The filler material 36 may be any suitable type of filler material that may be known to those skilled in the art of welding. The nozzle 34 may also be configured to deliver a shielding gas, for example, without limitation, an inert or semi-insert gas, to protect the weld zone from air and/or water vapor.

In operation, energy source 14 emits beam 16, which is directed and focused to a concentrated point on workpiece 12. The increased power density of beam 16 at the intersection with workpiece 12 generates the melt pool 18. The melt pool 18 is generated when the irradiated material changes to a liquefied state due to the intensity of the beam 16. A fusion weld results when the melt pool 18 cools. During the laser beam welding process, at least a portion of the beam 16 may be reflected by one or more of the workpiece 12, the melt pool 18, and the vapor cloud 20, back toward the welding apparatus 10, as represented by arrow 38 in FIG. 1. Moreover, the melt pool 18 and the vapor cloud 20 may emit electromagnetic radiation toward the welding apparatus 10. In addition, the aperture plate 30 may reflect the beam reflections 38 and the electromagnetic radiation emissions from the melt pool 18 toward the nozzle 34 of the filler material apparatus 32, as represented by arrow 40. This may cause the filler material to melt inside the nozzle 34, as one example, or the nozzle 34 to melt, as another example. Due to such beam reflections 38, 40 and electromagnetic radiation emissions from the melt pool 18, there may be a chance that the welding apparatus 10 may be damaged due to an excessive thermal loading on the components of the welding apparatus 10, for example, without limitation, the aperture plate 30, the optics 24, the nozzle 34, and/or the energy source 14. To facilitate protecting the welding apparatus 10, and in particular the optics 24, the welding apparatus includes the aperture plate 30.

As shown in FIG. 1, the aperture plate 30 includes aperture 28 defined therethrough for enabling the beam 16 to pass through to the workpiece 12. The aperture plate 30 includes a first end 42 and an opposite second end 44. In the illustrated example, the aperture plate 30 includes a generally planar top surface 46 oriented toward the optics 24 and extending between the first and second ends 42, 44 of the plate 30. In addition, the aperture plate 30 includes a bottom surface 48 opposite the top surface 46. In other suitable examples, the top surface 46 may have any suitable shape that enables the aperture plate 30 to function as described herein.

The bottom surface 48 may be configured with any number of forms, including for example, without limitation, a convex form, a planar form, a concave form, a free-form shape, or any combination thereof. The shape of the bottom surface 48 may be used to disperse or deflect the beam reflections 38 away from filler material apparatus 32 of the welding apparatus 10. For example, without limitation, a convex-shaped bottom surface 48 facilitates scattering or dispersing the beam 16 such that the power density of the beam 16 is reduced where it contacts the welding apparatus 10. In another example, a concave-shaped bottom surface 48 facilitates deflecting the beam 16 away from the filler material apparatus 32 by having a general area of focus defined away from the filler material apparatus. Dispersing and/or deflecting the beam away from the filler material apparatus 32 enables the operation time of the welding apparatus 10 to be increased. An increase in the operational life of the welding apparatus 10 results in a reduced operating cost of the welding apparatus, thereby reducing the manufacturing cost of the workpieces produced by the welding apparatus.

Referring back to FIG. 1, in the illustrated example, the bottom surface 48 is convex in shape. In the example of a convex-shaped bottom surface 48, a radius $R_1$ may be in the range between approximately 10 millimeters (mm) (0.4 inches (in.)) and approximately 500 mm (19.7 in.), in one example. Alternatively, radius $R_1$ may be any dimension that enables the bottom surface 48 to function as described herein. The bottom surface 48 intersects the first end 42 at an edge 50 and slopes generally upward toward the first surface 46, terminating proximate the second end 44 of the aperture plate 30. In one example, the aperture plate may have an overall height $H_1$ in the range between approximately 2 mm (0.08 in.) and approximately 15 mm (0.6 in.), where the maximum height is at the first end 42. Alternatively, the height $H_1$ may be any dimension that enables the aperture plate 30 to function as described herein. The convex-shaped bottom surface 48 is configured to scatter the beam reflection 38 to facilitate reducing the power density of the beam reflections 40 at the nozzle 34.

In these examples, the aperture plate 30 is releasably coupled to the welding head 26. The aperture plate 30 may include opposite tongues 52 located at the first and second ends 42, 44 configured to slide into corresponding opposite grooves 54 formed in welding head 26, in one example. Alternatively, the aperture plate 30 may be releasably coupled to welding head 26 in any manner that enables aperture plate 30 to function as described herein, for example, without limitation, by the use of mechanical fasteners.

The aperture plate 30 may be fabricated from copper a number of different types of materials, including, without limitation, copper, ceramic, metal, or a refractory composite material. For example, copper may be used to fabricate the aperture plate 30 due to its high reflectivity at room temperature of about 95%, thereby enabling the aperture plate 30 to reduce the electromagnetic radiation absorption from the reflected beam 38 and the electromagnetic radiation emissions from the melt pool 18. However, generally, as metals increase in heat, the reflectivity of the material decreases. For example, the reflectivity of copper decreases as the aperture plate 30 increases in heat, thereby increasing the amount of energy of beam 16 absorbed by the aperture plate and accelerating the thermal load accumulation in the material. To facilitate reducing the energy absorption of the aperture plate 30, the bottom surface 48 may be polished to a highly lustrous surface finish having high reflectivity. The bottom surface 48 may be polished using any known polishing technique that enables the aperture plate to function as described herein. For example, the bottom plate 48 may be both mechanically polished and electro-polished. Polishing the bottom surface 48 facilitates reducing the energy absorption of the aperture plate 30 during operation of the welding apparatus 10, thereby increasing the operational life of the aperture plate 30 and increasing the operation time of the welding apparatus 10. An increase in the service life of the aperture plate 30 results in a reduced operating cost of the welding apparatus, thereby reducing the manufacturing cost of the workpieces produced by the welding apparatus 10.

Alternatively, or in addition, in some examples, the bottom surface 48 includes a reflective coating layer coupled thereto by an adhering method or a plating method. For example, without limitation, the reflective coating layer may be a reflective sheet with a silver or gold color, a thin film with a silver or gold color, or a mirrored film adhered to the bottom surface 48. Alternatively, in another example, the reflective coating layer may be deposited on the bottom surface 48 using any practicable plating technology. For example, without limitation, the bottom surface 48 may be plated with a reflective material, e.g., chrome, nickel, silver, or gold, using electroplating or electroless plating. These plating processes are merely examples of plating processes that may be used, and various other plating processes may be used.

As described herein, as the aperture plate 30 increases in heat, the reflectivity of the material decreases. Accordingly, an increased amount of energy from beam 16 may be absorbed into the aperture plate 30, accelerating the heat accumulation if the aperture plate is not being actively cooled. As shown in FIG. 1, the aperture plate 30 optionally includes a fluid routing channel 56 defined between the top surface 46 and the bottom surface 48. The fluid routing channel 56 may be any cross-sectional shape that enables the aperture plate 30 to function as described herein. In addition, the fluid routing channel 56 may extend through the aperture plate 30 along any desirable route, and may include, for example, without limitation, linear portions, curved portions, serpentine portions, or any combination thereof.

With reference to FIG. 1, welding apparatus 10 optionally includes a fluid source 58 coupled in flow communication to the fluid routing channel 56 of the aperture plate 30. The term "fluid" as is used herein generally refers to liquids and gases, such as water and air. In operation, the fluid source 58 channels a fluid (not shown) to the fluid routing channel 56. Heat within the aperture plate 30 material is transferred to the fluid. The fluid may then be channeled back to the fluid source, where the heat may be expelled to the environment or two another fluid via a heat exchanger (not shown). In these examples, the aperture plate 30 may be actively cooled during operation of the welding apparatus 10, thereby increasing the operational life of the aperture plate 30 and increasing the operation time of the welding apparatus 10. An increase in the service life of the aperture plate 30 results in a reduced operating cost of the welding apparatus, thereby reducing the manufacturing cost of the workpieces produced by the welding apparatus 10.

Figure 2:
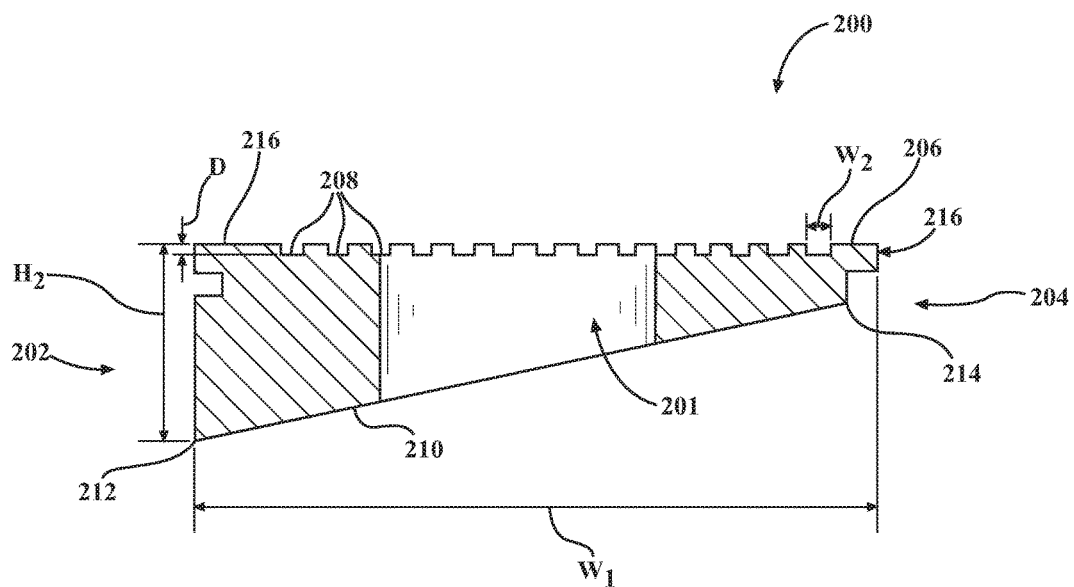
FIG. 2 is an illustrative sectional side view of an aperture plate for use with a welding apparatus.

FIG. 2 is a sectional side view illustrating an aperture plate 200 for use with a welding apparatus, such as welding apparatus 10 of FIG. 1. The aperture plate 200 includes an aperture 201 defined therethrough, and includes a first end 202 and an opposite second end 204. The aperture plate 200 also includes a substantially planar top surface 206 in this illustrative example. In other suitable examples, the top surface 206 may have any suitable shape that enables the aperture plate 200 to function as described herein. In this example, the aperture plate 200 may include opposite tongues 216 located at the first and second ends 202, 204, which are configured to slide into the grooves 54 (shown in FIG. 1) of the welding head 26 (shown in FIG. 1). Optionally, the top surface 206 includes a plurality of surface area increasing elements 208 disposed thereon. In one example, the surface area increasing elements 208 may be grooves defined in the top surface 206. The surface area increasing elements 208 may include, for example, without limitation, parallel passages, curved passages, or serpentine-shaped passages. In addition, the surface area increasing elements 208 may have any cross-section shape, including, without limitation, curved, rectangular, and semi-circular, and any combination thereof. In another example, the surface area increasing elements 208 may include a plurality of spaced apart structures, for example, without limitation, offset strip fin, pin fin, and/or dimple cooling configurations. An air flow (not shown) may be channeled across the surface area increasing elements 208 to increase convective heat transfer from the aperture plate 200. Optionally, in some examples, the aperture plate 200 may implement both the surface area increasing elements 208 and the fluid routing channel 56 described in FIG. 1 to facilitate increased convective heat transfer from the aperture plate 200.

The aperture plate 200 includes a bottom surface 210 opposite the top surface 206. The bottom surface 210 is nonparallel to the top surface 208 and intersects the first end 202 at an edge 212. In this example, the bottom surface 210 extends away from the edge 212, sloping generally upward toward the first surface 206, terminating proximate the second end 204 at an edge 214 of the aperture plate 200. In one example, the aperture plate 200 has an overall height $H_2$ in the range between approximately 2 mm (0.08 in.) and approximately 15 mm (0.6 in.), where the maximum height is at the first end 212, and an overall width $W_1$ in the range between approximately 40 mm (1.6 in.) and approximately 100 mm (3.9 in.). Alternatively, the height $H_2$ and width $W_1$ may be any dimension that enables the aperture plate 200 to function as described herein. Moreover, in one example, the surface area increasing elements 208 have a depth D in the range between approximately 0.1 mm (0.004 in.) and approximately 5 mm (0.2 in.), and a width $W_2$ in the range between approximately 0.1 mm (0.004 in.) and approximately 10 mm (0.4 in.). Alternatively, the depth D and the width $W_2$ may be any dimension that enables the surface area increasing elements 208 to function as described herein. The inclined bottom surface 210 is an example of one aperture plate configuration configured to deflect at least some beam reflections 38 away from the nozzle 34, thereby facilitating reduced heat adsorption by the nozzle 34.

Figure 3:
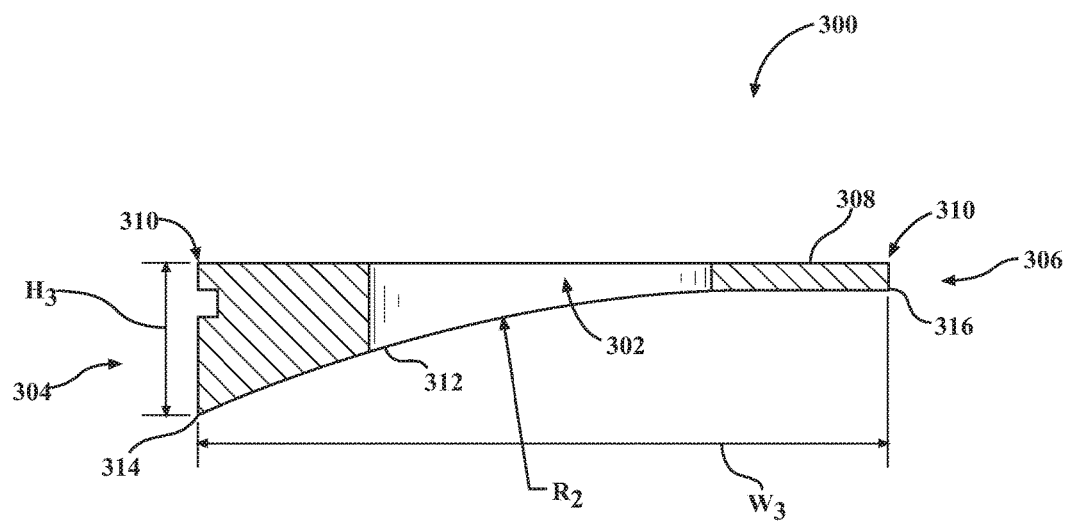
FIG. 3 is an illustrative sectional side view of an aperture plate for use with a welding apparatus.

FIG. 3 is a sectional side view illustrating an aperture plate 300 for use with a welding apparatus, such as welding apparatus 10 of FIG. 1. The aperture plate 300 includes an aperture 302 defined therethrough, and a first end 304 and an opposite second end 306. In this illustrative example, the aperture plate 300 also includes a substantially planar top surface 308, and opposite tongues 310 located at the first and second ends 304, 306, which are configured to slide into the grooves 54 (shown in FIG. 1) of the welding head 26 (shown in FIG. 1). The aperture plate 300 includes a bottom surface 312 opposite the top surface 308. In other suitable examples, the top surface 308 may have any suitable shape that enables the aperture plate 300 to function as described herein.

In the illustrated example, the bottom surface 312 is concave in shape. In the example of a concave-shaped bottom surface 312, a radius $R_2$ may be in the range between approximately 10 mm (0.4 in.) and approximately 500 mm (19.7 in.), in one example. Alternatively, radius $R_2$ may be any dimension that enables the bottom surface 312 to function as described herein. The bottom surface 312 intersects the first end 304 at an edge 314. The bottom surface 312 extends away from edge 314, sloping generally upward toward the first surface 308, terminating at the second end 306 at an edge 316 of the aperture plate 300. In one example, the aperture plate may have an overall height $H_3$ in the range between approximately 2 mm (0.08 in.) and approximately 15 mm (0.6 in.), where the maximum height is at the first end 304. Alternatively, the height $H_3$ may be any dimension that enables the aperture plate 300 to function as described herein. In one example, the width $W_3$ of the aperture plate 300 may be in the range between approximately 40 mm (1.6 in.) and approximately 100 mm (3.9 in.). Alternatively, the width $W_3$ may be any dimension that enables the aperture plate 300 to function as described herein. The concave-shaped bottom surface 312 is configured to direct the beam reflections 38 away from the nozzle 34 to facilitate eliminating the beam reflections 40 from impacting the nozzle 34.

FIG. 4 is an illustrative bottom view of an aperture plate 400 for use with a welding apparatus, such as welding apparatus 10 of FIG. 1. FIG. 5 is an end view of the aperture plate 400 of FIG. 4. The aperture plate 400 includes an aperture 402 defined therethrough. The aperture 402 may have any suitable shape configured to enable the beam 16 from the energy source 14 to function as described herein. In this example, the aperture plate 400 includes a first end 404 and an opposite second end 406, and a first side 408 and an opposite second side 410. The aperture plate 400 also includes a top surface 412 and a bottom surface 414 opposite the top surface 412. The top surface 412 may have any suitable shape that enables the aperture plate 400 to function as described herein.

In the example illustrated in FIG. 4, the bottom surface 414 is generally convex in shape. With reference to FIG. 5, the first and second ends 404, 406 form respective peaks 416, 418. As shown in FIG. 4, a longitudinal axis 420 extends between the peaks 416, 418. The bottom surface 414 includes a first portion 422 that intersects the longitudinal axis 420 and extends generally downward toward the first side 408. In addition, the bottom surface includes a second portion 424 that intersects the longitudinal axis 420 and extends generally downward toward the second side 410. The first and second portions 422, 424 have radiuses $R_3$ and $R_4$, respectively, that, in one example, may be in the range between approximately 10 millimeters (mm) (0.4 inches (in.)) and approximately 500 mm (19.7 in.). Alternatively, radiuses $R_3$ and $R_4$ may be any dimension that enables the bottom surface 414 to function as described herein. In one example, the aperture plate 400 has an overall height H4 in the range between approximately 2 mm (0.08 in.) and approximately 15 mm (0.6 in.). Alternatively, the height H4 may be any dimension that enables the aperture plate 400 to function as described herein. The convex-shaped bottom surface 414 is configured to scatter the beam reflection 38 to facilitate reducing the power density of the beam reflections 40 at the nozzle 34.

With reference to FIG. 5, alternative examples of aperture plate 400 are shown with reference to dashed lines 426, 428, 430, and 432. In one example, the convex-shaped first and second portions 422, 424 may be substantially planar, extending along dashed lines 426, 428, respectively. In another example, the convex-shaped first and second portions 422, 424 may be concave, extending along dashed lines 430, 432, respectively. In this example, the concave portions are shown with respective radiuses that may be in the range between approximately 10 millimeters (mm) (0.4 inches (in.)) and approximately 500 mm (19.7 in.). Alternatively, the respective radiuses may have any dimension that enables the aperture plate 400 to function as described herein. In other examples of the aperture plate 400, the first and second portions 422, 424 may have any combination of convex-shaped, planar, or concave-shaped surfaces, e.g., first portion 422 may be a convex-shaped surface and second portion 424 may be a planar surface.

Figure 6:
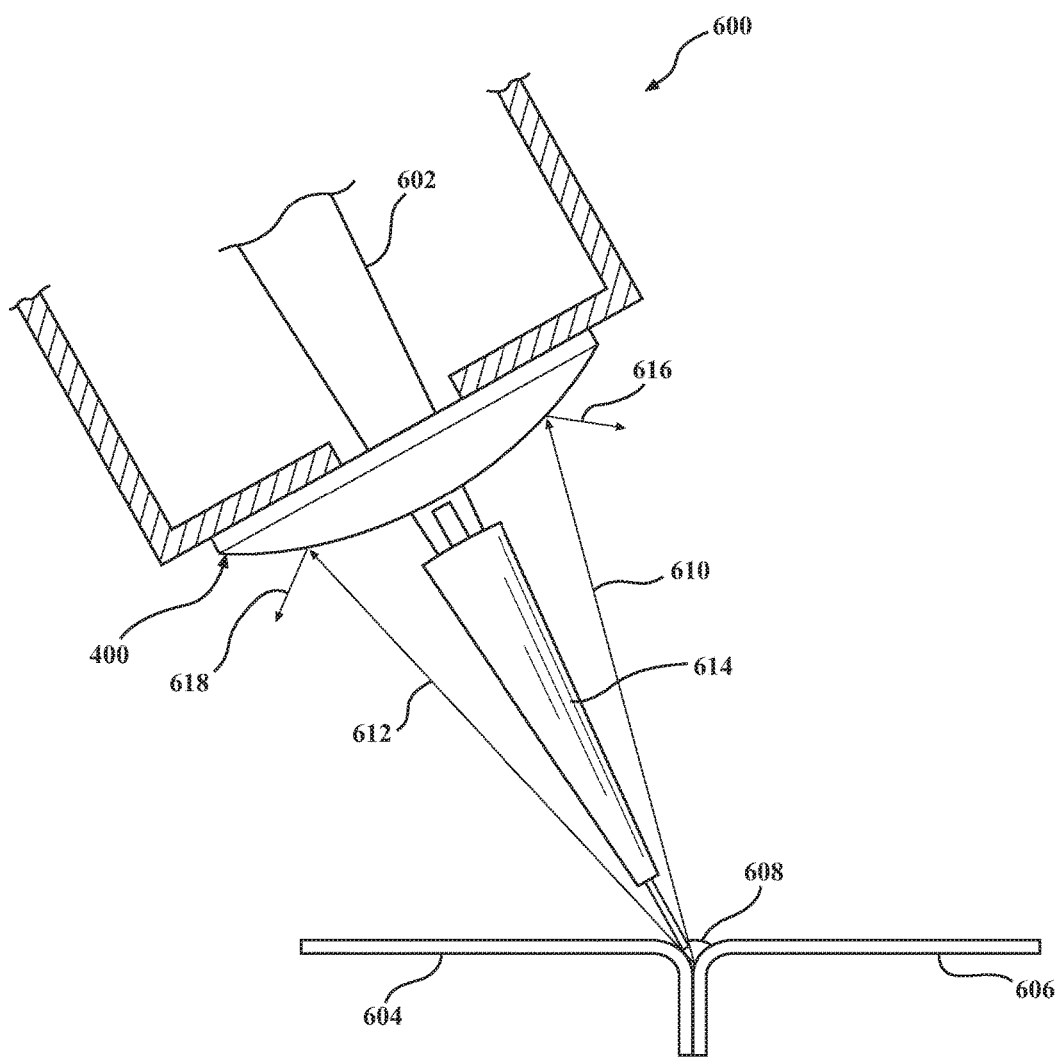
FIG. 6 is an illustrative schematic end view of a welding apparatus utilizing the aperture plate of FIGS. 4 and 5.

FIG. 6 is an illustrative schematic end view of a welding apparatus 600 utilizing the illustrative aperture plate 400 of FIGS. 4 and 5. In operation, a beam 602 may be directed and focused at an abutting point between two workpieces 604 and 606. The increased power density of beam 602 at the intersection of the beam and the workpieces 604 and 606 generates the melt pool 608. During the laser beam welding process, at least a portion of the beam 602 is reflected by one or more of the workpieces 604 and 606 back toward the welding apparatus 600, as represented by arrows 610 and 612. The aperture plate 400 deflects the beam reflections 610 and 612 away from a nozzle 614 of the welding apparatus 600, as represented by arrows 616 and 618.

Figure 7:
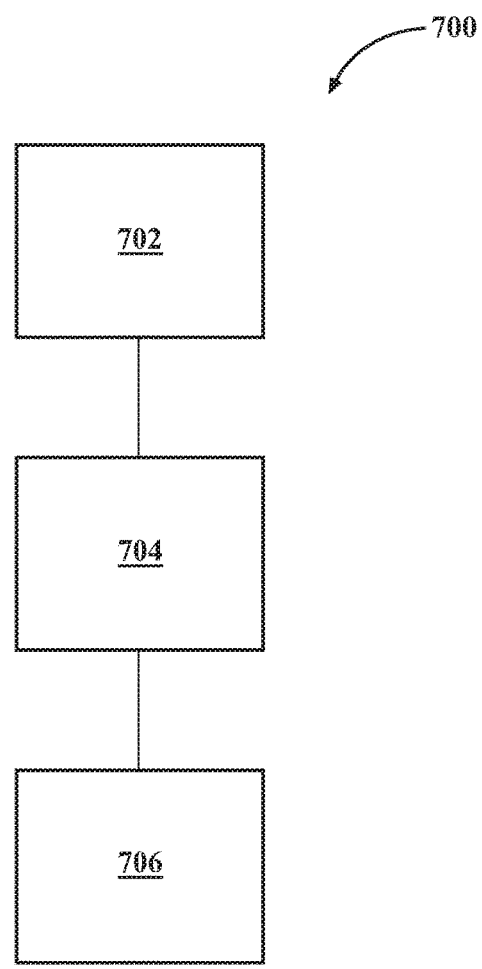
FIG. 7 is a flow chart illustrating a method of fabricating an aperture plate.

FIG. 7 is a flow chart illustrating a method 700 of fabricating an aperture plate. The method 700 is described herein with respect to fabricating the aperture plates 30, 200, 300, and 400 shown in FIGS. 1-5, for use in the welding apparatus 10 shown in FIG. 1. For clarity, only the aperture plate 30 will be described; however, the method described herein may apply to any of the illustrative aperture plates, including the aperture plates 30, 200, 300, and 400, as well as other alternative examples described herein. A body of the aperture plate 30 may be provided 702 with an aperture 28 defined therethrough. The aperture 28 enables the beam 16 of the welding apparatus 10 to pass through the body to the workpiece 12 that is being welded. The body of the aperture plate 30 may include a first end 42 and an opposite second end 44. A first surface 46 may be formed 704 between the first and second ends 42 and 44. The first surface extends between and intersects the first and second ends 42 and 44 of the aperture plate 30, and is oriented generally towards the energy source 14 of the welding apparatus 10 when the aperture plate is coupled to the welding apparatus 10.

A second surface 48 is formed 706 opposite the first surface 46 on the body of the aperture plate 30. The second surface 48 may be formed as a nonparallel surface to the first surface 46. In one example, the second surface 48 is formed such that at least a portion of the second surface 48 includes one or more of the following: a planar surface, a concave surface, a convex surface, and a free-form surface. The second surface 48 may be oriented such that it intersects the first end 42 of the aperture plate 30 at the edge 50, and slopes generally toward the first surface 46 as it extends to the second end 44 of the aperture plate 30.

The exemplary operations presented in FIG. 7 are not intended to provide any limitations on the order or manner of steps or operations implemented in the aperture plate fabrication process. Any number of suitable alternatives may be performed during the aperture plate fabrication process to reduce the energy absorption quality and the deflective capability of the aperture plate. For example, surface treatments may be applied to a bottom surface to further increase reflective capabilities in addition to configuring the shape of the bottom surface to deflect reflected energy.

As used herein, the singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, example ranges described may be combined and/or interchanged; such ranges are identified and include all the sub-ranges contained therein unless context or language indicates otherwise.

The apparatus and systems described herein facilitate reducing the energy absorption of an aperture plate of a welding apparatus, thereby reducing the thermal load on the aperture plate. Furthermore, the configurations of the aperture plate facilitate dispersing and deflecting laser beam reflections and emissions to reduce or eliminate contact with a nozzle associated with the welding apparatus, such as a filler material nozzle or a shielding gas nozzle, for example. By reducing the energy absorption of the aperture plate and deflecting the beam reflections away from the nozzle, the service life of the aperture plate and the operation time of the welding apparatus may be increased. An increase in the service life of the aperture plate reduces operating costs of the welding apparatus, thereby reducing the manufacturing cost of the workpieces produced by the welding apparatus.

Alternatively or in addition to the other examples described herein, examples include any combination of the following:

the first surface comprises at least one surface area increasing element disposed thereon;

the at least one surface area increasing element comprises a channel defined in the first surface;

at least a portion of the second surface comprises a polished surface;

the second surface comprises a reflective coating layer formed on at least a portion of the second surface;

at least one fluid routing channel defined within the body between the first surface and the second surface;

the first end comprises a first edge, the second surface intersecting the first edge and sloped generally toward the first surface;

at least a portion of the second surface comprises a concave surface, the concave surface portion intersecting the first end and sloped generally toward the first surface;

the second surface comprises a convex surface, the convex surface intersecting the first end and sloped generally toward the first surface;

a first side and a second side opposite the first side;

the first end is shaped to form a first peak and the second end is shaped to form a second peak, the body including an axis extending between the first and second peaks, the second surface comprising a first portion intersecting the axis and sloped generally toward the first side, and a second portion intersecting the axis and sloped generally toward the second side;

the first portion and the second portion comprise one or more of the following: a planar surface portion, a concave surface portion, and a convex surface portion;

the body comprises a refractory material;

a nozzle;

a first surface oriented toward the energy source generating the melt pool;

first end and a second end opposite the first end, the first surface extending between the first and second ends;

a second surface formed opposite the first surface and nonparallel to the first surface, such that electromagnetic radiation is reflected away from the nozzle, the second surface oriented toward the workpiece;

the first surface comprises at least one surface area increasing element disposed thereon;

the electromagnetic radiation is reflected by one or more of the workpiece and the melt pool, or emitted by the melt pool;

at least a portion of the second surface comprises one or more of the following: a planar surface, a concave surface, and a convex surface;

the first end is shaped to form a first peak and the second end is shaped to form a second peak, the aperture plate including an axis extending between the first and second peaks and generally aligned with the nozzle, the second surface comprising a first portion and a second portion opposite the first portion, the first and second portions intersecting the axis and sloping generally toward the first surface;

forming the second surface comprises forming the second surface such that at least a portion of the second surface includes one or more of the following: a planar surface, a concave surface, and a convex surface, the second surface intersecting the first end and sloping generally toward the first surface.

The apparatus and systems described herein are not limited to the specific examples described herein. For example, components of each apparatus and system may be utilized independently and separately from other components described herein. For example, the apparatus and systems may also be used in combination with other welding systems, and are not limited to practice in any particular industry. Rather, the illustrative examples may be implemented and utilized in connection with many other applications and industries.

Although specific features of various illustrative examples of the disclosure may be shown in some drawings and not in others, this is for convenience only. In accordance with the principles of the disclosure, any feature of a drawing may be referenced and/or claimed in combination with any feature of any other drawing.

While the disclosure has been described in terms of different illustrative examples, those skilled in the art will recognize that the disclosure may be practiced with modification within the spirit and scope of the claims.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An aperture plate for a welding apparatus, said aperture plate comprising:
   a body defining an aperture, said body comprising:
   a first end;
   a second end opposite said first end;
   a first surface intersecting said first and second ends; and
   a second surface formed opposite said first surface and nonparallel to said first surface, such that electromagnetic radiation is reflected away from components of the welding apparatus.

2. The aperture plate of claim 1, wherein said first surface comprises at least one surface area increasing element disposed thereon.

3. The aperture plate of claim 2, wherein said at least one surface area increasing element comprises a channel defined in said first surface.

4. The aperture plate of claim 1, wherein at least a portion of said second surface comprises a polished surface.

5. The aperture plate of claim 1, wherein said second surface comprises a reflective coating layer formed on at least a portion of said second surface.

6. The aperture plate of claim 1 further comprising at least one fluid routing channel defined within said body between said first surface and said second surface.

7. The aperture plate of claim 1, wherein said first end comprises a first edge, said second surface intersecting said first edge and sloped generally toward said first surface.

8. The aperture plate of claim 1, wherein at least a portion of said second surface comprises a concave surface, said concave surface portion intersecting said first end and sloped generally toward said first surface.

9. The aperture plate of claim 1, wherein said second surface comprises a convex surface, said convex surface intersecting said first end and sloped generally toward said first surface.

10. The aperture plate of claim 1 further comprising:
    a first side and a second side opposite said first side,
    wherein said first end is shaped to form a first peak and said second end is shaped to form a second peak, said body including an axis extending between said first and second peaks, said second surface comprising a first portion intersecting the axis and sloped generally toward said first side, and a second portion intersecting the axis and sloped generally toward said second side.

11. The aperture plate of claim 10, wherein said first portion and said second portion comprise one or more of the following: a planar surface portion, a concave surface portion, and a convex surface portion.

12. The aperture plate of claim 1, wherein said body comprises a refractory material.

13. A welding apparatus for welding a workpiece, said welding apparatus comprising:
    an energy source configured to generate a melt pool in a zone of the workpiece; and
    an aperture plate releasably coupled to said welding apparatus, said aperture plate comprising at least one fluid routing channel defined within said aperture plate, such that convective heat transfer away from the aperture plate occurs via a fluid source coupled in flow communication with the at least one fluid routing channel.

14. The welding apparatus of claim 13, wherein said aperture plate further comprises:
    a nozzle;
    a first surface oriented toward said energy source generating the melt pool;
    a first end and a second end opposite said first end, said first surface extending between said first and second ends; and
    a second surface formed opposite said first surface and nonparallel to said first surface, such that electromagnetic radiation is reflected away from said nozzle, said second surface oriented toward the workpiece.

15. The welding apparatus of claim 14, wherein said first surface comprises at least one surface area increasing element disposed thereon.

16. The welding apparatus of claim 14, wherein the electromagnetic radiation is reflected by one or more of the workpiece and the melt pool, or emitted by the melt pool.

17. The welding apparatus of claim 14, wherein at least a portion of said second surface comprises one or more of the following: a planar surface, a concave surface, and a convex surface.

18. The welding apparatus of claim 14, wherein said first end is shaped to form a first peak and said second end is shaped to form a second peak, said aperture plate including an axis extending between said first and second peaks and generally aligned with said nozzle, said second surface comprising a first portion and a second portion opposite said first portion, said first and second portions intersecting the axis and sloping generally toward said first surface.

19. A method of fabricating an aperture plate for a welding apparatus, said method comprising:
- providing a body defining an aperture, the body including a first end and a second end opposite the first end;
- forming a first surface that extends between the first and second ends; and
- forming a second surface opposite the first surface, the second surface being nonparallel to the first surface, such that electromagnetic radiation is reflected away from components of the welding apparatus.

20. The method of claim 19, wherein forming the second surface comprises forming the second surface such that at least a portion of the second surface includes one or more of the following: a planar surface, a concave surface, and a convex surface, the second surface intersecting the first end and sloping generally toward the first surface.

* * * * *